(12) United States Patent
Miura et al.

(10) Patent No.: US 6,239,204 B1
(45) Date of Patent: May 29, 2001

(54) CROSS-LINKED SOLID POLYELECTROLYTE AND USE THEREOF

(75) Inventors: Katsuhito Miura; Shigeru Shoji, both of Hyogo; Takahiro Sakashita, Osaka; Yasuo Matoba, Hyogo, all of (JP)

(73) Assignee: Baiso Co., Ltd., Osaka (JP)

( * ) Notice: Subject to any disclaimer, the term of this patent is extended or adjusted under 35 U.S.C. 154(b) by 0 days.

(21) Appl. No.: 09/147,159

(22) PCT Filed: May 6, 1997

(86) PCT No.: PCT/JP97/01522

§ 371 Date: Oct. 21, 1998

§ 102(e) Date: Oct. 21, 1998

(87) PCT Pub. No.: WO97/42251

PCT Pub. Date: Nov. 13, 1997

(30) Foreign Application Priority Data

| May 8, 1996 | (JP) | 8-113496 |
| Jul. 3, 1996 | (JP) | 8-173435 |
| Jul. 12, 1996 | (JP) | 8-183186 |
| Sep. 18, 1996 | (JP) | 8-246199 |

(51) Int. Cl.⁷ ............... C08K 3/30; C08K 3/10; C08K 3/28
(52) U.S. Cl. ............ 524/401; 524/413; 524/408; 524/157; 524/255; 528/418; 528/403; 528/27; 549/555; 523/440; 429/190; 429/192; 252/62.2; 361/525
(58) Field of Search .................. 524/401, 413, 524/408, 157, 255; 528/418, 406, 403, 27; 549/555; 523/440; 429/190, 192; 252/62.2; 361/525

(56) References Cited

U.S. PATENT DOCUMENTS

| 3,297,783 | 1/1967 | Bailey, Jr. ............... 260/836 |
| 4,303,748 | 12/1981 | Armand et al. ........... 429/192 |
| 4,578,326 | 3/1986 | Armand et al. ........... 429/192 |
| 4,758,483 | 7/1988 | Armand et al. ........... 429/192 |
| 4,818,644 | 4/1989 | Armand ..................... 429/192 |
| 4,822,701 | 4/1989 | Ballard et al. ........... 429/192 |
| 5,162,174 | 11/1992 | Andrei et al. ............ 429/192 |
| 5,527,639 | 6/1996 | Noda et al. .............. 429/192 |
| 5,837,157 | * 11/1998 | Kohjiya et al. ......... 252/62.2 |
| 5,968,681 | * 10/1999 | Miura et al. ............ 429/122 |

FOREIGN PATENT DOCUMENTS

| 1269702 | 5/1990 | (CA) . |
| 195 27 741 | 3/1996 | (DE) . |
| 0 174 894 | 3/1986 | (EP) . |
| 0 222 586 | 5/1987 | (EP) . |
| 0 331 342 | 9/1989 | (EP) . |
| 0 392 839 | 10/1990 | (EP) . |
| 0 460 876 | 12/1991 | (EP) . |
| 0 559 317 | 8/1993 | (EP) . |
| 0 585 072 | 3/1994 | (EP) . |
| 0 742 563 | 11/1996 | (EP) . |
| 62-169823 | 7/1987 | (JP) . |
| 62-249361 | 10/1987 | (JP) . |
| 63-154736 | 6/1988 | (JP) . |
| 2-235957 | 9/1990 | (JP) . |
| 2-295004 | 12/1990 | (JP) . |
| 3-200865 | 1/1991 | (JP) . |
| 3-47833 | 2/1991 | (JP) . |
| 3-200864 | 9/1991 | (JP) . |
| 4-36347 | 2/1992 | (JP) . |
| 4-68064 | 3/1992 | (JP) . |
| 5-304051 | 11/1993 | (JP) . |
| 9-324114 | 12/1997 | (JP) . |

OTHER PUBLICATIONS

Macromolecules, 23, 1256–1264 (1990), Ballard et al.*
K. Motogami et al., "Electrochimica Acta", *A New Polymer Electrolyte Based on Polyglycidylether*, vol. 37, No. 9, pp. 1725–1727, (1992).
D.G.H. Ballard et al., "Macromolecules", *Ionic Conductivity in Organic Solids Derived from Amorphous Macromolecules*, vol. 23, pp. 1256–1264, (1990).
M. Kono et al., "Polymers for Advanced Technologies", *Synthesis of Polymer Electrolytes Based on Poly[2–2(methoxyethoxy) ethel glycidyl ether] and Their High Ionic Conductivity*, vol. 4, pp. 85–91, (Jun. 1992).

* cited by examiner

Primary Examiner—Robert Dawson
Assistant Examiner—Kuo-Liang Peng
(74) Attorney, Agent, or Firm—Foley & Lardner

(57) ABSTRACT

A crosslinked material of a polyether copolymer comprising:

(A) 1 to 98% by mol of a repeating unit derived from a monomer represented by the formula (I):

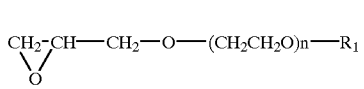

(I)

(B) 95 to 1% by mol of a repeating unit derived from a monomer represented by the formula (II):

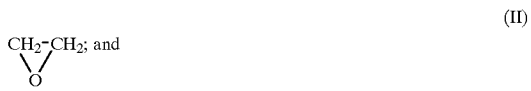

(II)

(C) 0.005 to 15% by mol of a repeating unit derived from a monomer having one epoxy group and at least one reactive functional group; provides a polymer solid electrolyte which is superior in ionic conductivity and also superior in processability, moldability, mechanical strength and flexibility, furthermore thermal resistance.

23 Claims, No Drawings

CROSS-LINKED SOLID POLYELECTROLYTE AND USE THEREOF

FIELD OF THE INVENTION

The present invention relates to a crosslinkable polyether copolymer, a crosslinked material of the copolymer, and a crosslinked solid polyelectrolyte. More particularly, the present invention relates to a solid polyelectrolyte which is suitable as a material for an electrochemical device such as a battery, a capacitor and a sensor.

RELATED ART

As an electrolyte constituting an electrochemical device such as a battery, a capacitor and a sensor, those in the form of a solution or a paste have hitherto been used in view of the ionic conductivity. However, the following problems are pointed out. There is a fear of damage of an apparatus arising due to liquid leakage, and subminiaturization and thinning of the device are limited because a separator to be impregnated with an electrolyte solution is required. To the contrary, a solid electrolyte such as an inorganic crystalline substance, inorganic glass, and an organic polymer substance is suggested. The organic polymer substance is generally superior in processability and moldability and the resulting solid electrolyte has good flexibility and bending processability and, furthermore, the design freedom of the device to be applied is high and, therefore, the development thereof is expected. However, the organic polymer substance is inferior in ionic conductivity to other materials at present.

For example, a trial of containing a specific alkaline metal salt in a mixture of an epichlorohydrin rubber and a low-molecular weight polyethylene glycol derivative and applying the resultant to a polymer solid electrolyte is suggested in Japanese Patent Kokai Publication No. 235957/1990 including the present applicant, but a practically sufficient conductivity value is not still obtained.

Furthermore, a polymer solid electrolyte prepared by crosslinking a polymer compound having average molecular weight of from 1,000 to 20,000, described in Japanese Patent Kokai Publication Nos. 47833/1991 and 68064/1992, shows a comparatively good ionic conductivity within the practical temperature range, but those having more excellent mechanical characteristics and ionic conductivity are required.

A polyether copolymer having an oligooxyethylene side chain described in Japanese patent Application No. 109616/1995 of the present applicant shows excellent ionic conductivity at room temperature (e.g. 30° C.). However, because of having no crosslinked structure, when using temperature is high (e.g. 60° C.), inconvenience arises by plastic deformation. For example, when using in a thin type battery, there is a fear of a short circuit between a positive electrode and a negative electrode.

SUMMARY OF THE INVENTION

An object of the present invention is to provide a solid electrolyte, which is superior in ionic conductivity, and which causes no plastic deformation or has no fluidity even under high temperature.

Another object of the present invention is to provide a polymer, which gives the above solid electrolyte.

The present invention provides a polyether copolymer having a number-average molecular weight of 50,000 to 2,000,000, a glass transition temperature measured by a differential scanning calorimeter (DSC) of not more than −60° C. and a fusion heat of not more than 70 J/g, comprising:

(A) 1 to 98% by mol of a repeating unit derived from a monomer represented by the formula (I):

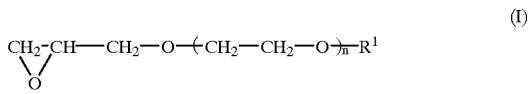

wherein $R^1$ is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atoms and a tetrahydropyranyl group and n is preferably from 1 to 12;

(B) 95 to 1% by mol of a repeating unit derived from a monomer represented by the formula (II):

(C) 0.005 to 15% by mol of a repeating unit derived from a monomer having one epoxy group and at least one reactive functional group.

The present invention also provides a crosslinked material obtained by crosslinking the above copolymer.

Furthermore, the present invention provides a solid polyelectrolyte comprising the above crosslinked material and an electrolyte salt compound.

Furthermore, the present invention provides a battery comprising said solid polyelectrolyte.

DETAILED DESCRIPTION OF THE INVENTION

The repeating unit (C) may be derived from a monomer of the formula (III-1) or (III-2):

wherein $R^2$ and $R^3$ represent a reactive functional group-containing group.

The polymer of the present invention comprises (A) a repeating unit derived from a monomer of the formula (I):

wherein $R^1$ is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atoms and a tetrahydropyranyl group and n is preferably from 1 to 12, (B) a repeating unit derived from a monomer of the formula (II):

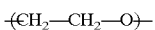 (II')

and (C) a repeating unit derived from a monomer having one epoxy group and at least one reactive functional group.

The repeating unit (C) derived from a monomer of the formula (III-1) or (III-2) is represented by the formula (III'-1) or (III'-2):

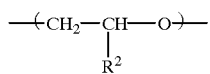 (III'-1)

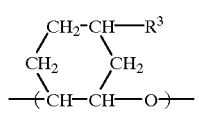 (III'-2)

wherein $R^2$ and $R^3$ represent a reactive functional group-containing group.

The reactive functional group in the repeating unit (C) is preferably (a) a reactive silicon group, (b) an epoxy group, (c) an ethylenically unsaturated group, or (d) a halogen atom.

The polymerization method of the polyether copolymer having a crosslinkable side chain of the present invention is conducted in the same manner as in Japanese Patent Kokai Publication Nos. 154736/1988 and 169823/1987 of the present applicant.

The polymerization reaction can be conducted as follows. That is, the polyether copolymer can be obtained by reacting the respective monomers at the reaction temperature of 10 to 80° C. under stirring, using a catalyst mainly composed of an organoaluminum, a catalyst mainly composed of an organozinc, an organotin-phosphate ester condensate catalyst and the like as a ring opening polymerization catalyst in the presence or absence of a solvent. The organotin-phosphate ester condensate catalyst is particularly preferable in view of the polymerization degree or properties of the resulting copolymer. In the polymerization reaction, the reaction functional group does not react and a copolymer having the reaction functional group is obtained.

In the polyether copolymer of the present invention, the content of the repeating unit (A) is from 1 to 98% by mol, preferably from 3 to 98% by mol, e.g. from 5 to 90% by mol; the content of the repeating unit (B) is from 95 to 1% by mol, preferably from 95 to 1% by mol, e.g. from 90 to 5% by mol; and the content of the repeating unit (C) is from 0.005 to 10% by mol, preferably from 0.01 to 5% by mol, e.g. from 0.05 to 5% by mol. When the content of the repeating unit (B) exceeds 95% by mol, an increase in glass transition temperature and crystallization of the oxyethylene chain arise, which results in drastic deterioration of the ionic conductivity of the solid electrolyte. It is generally known that the ionic conductivity is improved by the decrease of the crystallizability of polyethylene oxide. It has been found that, in case of the polyether copolymer of the present invention, the effect for improvement of the ionic conductivity is remarkably large. On the other hand, when the molar ratio of the repeating unit (C) is smaller than 0.005% by mol, the copolymer can not be sufficiently crosslinked and, therefore, it is difficult to obtain a solid electrolyte at high temperature range (e.g. 60° C.). When the molar ratio of the repeating unit (C) is larger than 15% by mol, it becomes impossible to form a film.

The glass transition temperature and fusion heat of the polyether copolymer are measured by a differential scanning calorimeter (DSC). In the present invention, the glass transition temperature of the polyether copolymer is not more than −60° C., preferably not more than −63° C., e.g. not more than −65° C. The fusion heat of the polyether copolymer is not more than 70 J/g, e.g. not more than 60 J/g, particularly not more than 50 J/g. When the glass transition temperature and fusion heat exceed the above values, deterioration of the ionic conductivity arises.

The polyether copolymer of the present invention may be any copolymer type such as a block copolymer and a random copolymer, but the random copolymer is preferable because the effect for reduction of the crystallizability of polyethylene oxide is large. The polyether copolymer of the present invention is a polyether copolymer having an oligooxyethylene side chain and a side chain containing a crosslinkable reactive functional group. The polyether copolymer of the present invention is normally a terpolymer formed from three monomers, but it may be a copolymer formed from at least four monomers.

The monomer having a reactive silicon group, which constitutes the repeating unit (C), is preferably represented by the formula (III-a-1):

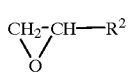 (III-a-1)

wherein $R^2$ is a reactive silicon group-containing group, or the formula (III-a-2):

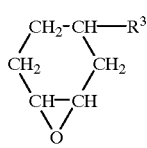 (III-a-2)

wherein $R^3$ is a reactive silicon-containing group.

The reactive silicon group-containing monomer represented by the formula (III-a-1) is preferably a compound represented by the formula (III-a-1-1) or (III-a-1-2).

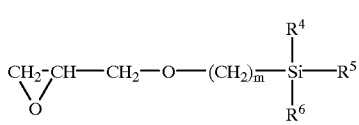 (III-a-1-1)

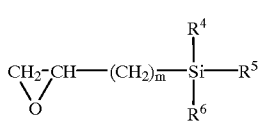 (III-a-1-2)

The reactive silicon group-containing monomer represented by the formula (III-a-2) is preferably a compound represented by the formula (III-a-2-1).

(III-a-2-1)

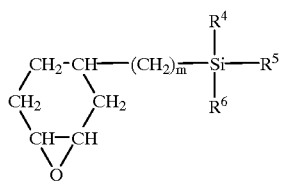

In the formulas (III-a-1-1), (III-a-1-2) and (III-a-2-1), $R^4$, $R^5$ and $R^6$ may be the same or different, but at least one of them represents an alkoxy group and the remainder represents an alkyl group; and m represents 1 to 6.

Examples of the monomer represented by the formula (III-a-1-1) include 1-glycidoxymethyltrimethoxysilane, 1-glycidoxymethylmethyidimethoxysilane, 2-glycidoxyethyltrimethoxysilane, 2-glycidoxyethylmethyidimethoxysilane, 3-glycidoxypropylmethyldimethoxysilane, 3-glycidoxypropyltrimethoxysilane, 4-glycidoxybutylmethyldimethoxysilane, 4-glycidoxybutylmethyltrimethoxysilane, 6-glycidoxyhexylmethyldimethoxysilane and 6-glycidoxyhexylmethyltrimethoxysilane.

Examples of the monomer represented by the formula (III-a-1-2) include 3-(1,2-epoxy)propyltrimethoxysilane, 3-(1,2-epoxy)propylmethyldimethoxysilane, 3-(1,2-epoxy)propyldimethylmethoxysilane, 4-(1,2-epoxy)butyltrimethoxysilane, 4-(1,2-epoxy)butylmethyiditrimethoxysilane, 5-(1,2-epoxy)pentyltrimethoxysilane, 5-(1,2-epoxy)pentylmethyidimethoxysilane, 6-(1,2-epoxy)hexyltrimethoxysilane and 6-(1,2-epoxy)hexylmethyldimethoxysilane.

Examples of the monomer represented by the formula (III-a-2-1) include 1-(3,4-epoxycyclohexyl)methyltrimethoxysilane, 1-(3,4-epoxycyclohexyl)methylmethyidimethoxysilane, 2-(3,4-epoxycyclohexyl)ethyltrimethoxysilane, 2-(3,4-epoxycyclohexyl)ethylmethyidimethoxysilane, 3-(3,4-epoxycyclohexyl)propyltrimethoxysilane, 3-(3,4-epoxycyclohexyl)propylmethyidimethoxysilane, 4-(3,4-epoxycyclohexyl)butyltrimethoxysilane and 4-(3,4-epoxycyclohexyl)butylmethyldimethoxysilane.

Among them, 3-glycidoxypropyltrimethoxysilane, 3-glycidoxypropylmethyidimethoxysilane, 4-(1,2-epoxy)butyltrimethoxysilane, 5-(1,2-epoxy)pentyltrimethoxysilane and 2-(3,4-epoxycyclohexyl)ethyltrimethoxysilane are particularly preferable.

The monomer having two epoxy groups, which constitutes the repeating unit (C), is preferably represented by the formula (III-b):

(III-b)

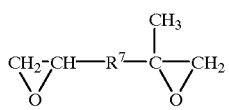

wherein $R^7$ is a divalent organic group.

It is preferable that the group $R^7$ in the formula (III-b) is
—CH$_2$—O—(CHA$^1$—CHA$^2$—O)$_m$—CH$_2$—,
—(CH$_2$)$_m$—, or
—CH$_2$O—Ph—OCH$_2$—
wherein $A^1$ and $A^2$ represent hydrogen or a methyl group; Ph represents a phenylene group; and m represents a numeral of 0 to 12.

The monomer having two epoxy groups is preferably a compound represented by the following formula (III-b-1), (III-b-2) or (III-b-3):

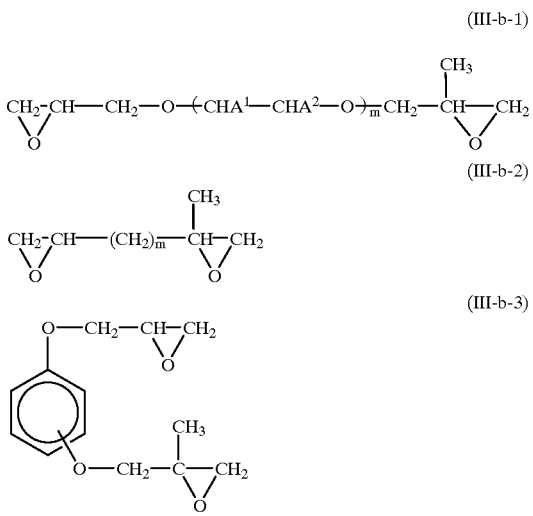

In the above formulas (III-b-1), (III-b-2) and (III-b-3), $A^1$ and $A^2$ represent a hydrogen atom or a methyl group; and m represents a numeral of 0 to 12.

Examples of the monomer represented by the formula (III-b-1) include 2,3-epoxypropyl-2',3'-epoxy-2'-methyl propyl ether, ethylene glycol-2,3-epoxypropyl-2',3'-epoxy-2'-methyl propyl ether, and diethylene glycol-2,3-epoxypropyl-2',3'-epoxy-2'-methyl propyl ether. Examples of the monomer represented by the formula (III-b-2) include 2-methyl-1,2,3,4-diepoxybutane, 2-methyl-1,2,4,5-diepoxypentane, and 2-methyl-1,2,5,6-diepoxyhexane. Examples of the monomer represented by the formula (III-b-3) include hydroquinone-2,3-epoxypropyl-2',3'-epoxy-2'-methyl propyl ether and catechol-2,3-epoxypropyl-2',3'-epoxy-2'-methyl propyl ether.

Among them, 2,3-epoxypropyl-2',3'-epoxy-2'-methyl propyl ether and ethylene glycol-2,3-epoxypropyl-2',3'-epoxy-2'-methyl propyl ether are particularly preferable.

The monomer having the ethylenically unsaturated group, which constitutes the repeating unit (C), is preferably represented by the formula (III-c):

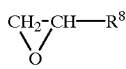

wherein $R^8$ is a group having an ethylenically unsaturated group.

As the ethylenically unsaturated group-containing monomer, there can be used allyl glycidyl ether, 4-vinylcyclohexyl glycidyl ether, α-terpinyl glycidyl ether, cyclohexenylmethyl glycidyl ether, p-vinylbenzyl glycidyl ether, allylphenyl glycidyl ether, vinyl glycidyl ether, 3,4-epoxy-1-butene, 3,4-epoxy-1-pentene, 4,5-epoxy-2-pentane, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbate, glycidyl cinnamate, glycidyl crotonate, glycidyl-4-hexenoate, oligoethylene glycol glycidyl ether acrylate having 1 to 12 oxyethylene repeating units, oligoethylene glycol glycidyl ether methacrylate having 1 to 12 oxyethylene repeating units, oligoethylene glycol allyl glycidyl ether having 1 to 12 oxyethylene repeating units or

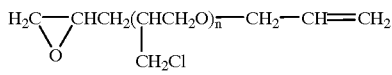

(n=1–12).

Preferable examples thereof include allyl glycidyl ether, glycidyl acrylate and glycidyl methacrylate.

The monomer (C) having a halogen atom is preferably represented by the formula (III-d):

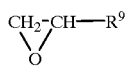 (III-d)

wherein $R^9$ is a group having at least one halogen atom.

Examples of the monomer having a halogen atom include:

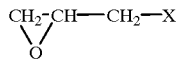

wherein X is a halogen atom, particularly a bromine atom (Br) or an iodine atom (I).

The polymerization degree n of the oxyethylene unit of the side chain portion in the monomer (I), which constitutes the repeating unit (A), is preferably from 1 to 12, e.g. 1 to 6. When the polymerization degree n exceeds 12, the ionic conductivity of the resulting polymer solid electrolyte is deteriorated, unfavorably. In the monomer (I), $R^1$ may be a methyl group, an ethyl group, a propyl group, a butyl group, a pentyl group, a hexyl group, an allyl group or a cyclohexyl group.

As the molecular weight of the polyether copolymer, the number-average molecular weight is suitable within the range from 50,000 to 2,000,000, preferably from 100,000 to 2,000,000, so as to obtain excellent processability, moldability, mechanical strength and flexibility. When the number-average molecular weight is smaller than 50,000, it is necessary to increase the crosslink density so as to maintain the mechanical strength or to prevent from flowing at high temperature, which results in deterioration of ionic conductivity of the resulting electrolyte. On the other hand, when it exceeds 2,000,000, the processability and moldability become insufficient.

In the crosslinking method of the copolymer wherein the reactive functional group is a reactive silicon group, the crosslinking can be conducted by the reaction between the reactive silicon group and water. In order to enhance the reactivity, there may be used, as a catalyst, organometal compounds, for example, tin compounds such as dibutyltin dilaurate, dibutyltin maleate, dibutyltin diacetate, tin octylate and dibutyltin acetylacetonate; titanium compounds such as tetrabutyl titanate and tetrapropyl titanate; aluminum compounds such as aluminum trisacetyl acetonate, aluminum trisethyl acetoacetate and diisopropoxyaluminum ethylacetoacetate; or amine compounds such as butylamine, octylamine, laurylamine, dibutylamine, monoethanolamine, diethanolamine, triethanolamine, diethylenetriamine, trietylenetetraamine, cyclohexylamine, benzylamine, diethylaminopropylamine, guanine and diphenylguanine.

In the crosslinking method of the copolymer, wherein the reactive functional group is an epoxy group, for example, polyamines and acid anhydrides can be used.

Examples of the polyamines include aliphatic polyamines such as diethylenetriamine, dipropylenetriamine, triethylenetetramine, tetraethylenepentamine, dimethylaminopropylamine, diethylaminopropylamine, dibutylaminopropylamine, hexamethylenediamine, N-aminoethylpiperazine, bis-aminopropylpiperazine, trimethylhexamethylenediamine and dihydrazide isophthalate; and aromatic polyamines such as 4,4'-diamino diphenyl ether, diamino diphenyl sulfone, m-phenylenediamine, 2,4-toluylenediamine, m-toluylenediamine, o-toluylenediamine and xylylenediamine. The amount of the polyamine varies depending on the type of the polyamine, but is normally within the range from 0.1 to 10% by weight based on the whole composition.

Examples of the acid anhydrides includes maleic anhydride, dodecenylsuccinic anhydride, chlorendic anhydride, phthalic anhydride, pyromellitic anhydride, hexahydrophthalic anhydride, methylhexahydrophthalic anhydride, tetramethylenemaleic anhydride, tetrahydrophthalic anhydride, methyltetrahydrophthalic anhydride and trimellitic anhydride. The amount of the acid anhydrides varies depending on the type of the acid anhydride, but is normally within the range from 0.1 to 10% by weight based on the whole composition. In the crosslinking, an accelerator can be used. In the crosslinking reaction of polyamines, the accelerator include phenol, cresol, resorcin, pyrogallol, nonyl phenol and 2,4,6-tris(dimethylaminomethyl)phenol. In the crosslinking reaction of the acid anhydride, the accelerator include benzyldimethylamine, 2,4,6-tris (dimethylaminomethyl)phenol, 2-(dimethylaminoethyl) phenol, dimethylaniline and 2-ethyl-4-methylimidazol. The amount of the accelerator varies depending on the type of the accelerator, but is normally within the range from 0.1 to 10% by weight based on the crosslinking agent.

In the crosslinking method of the copolymer wherein the reactive functional group is ethylenically unsaturated group, a radical initiator selected from an organic peroxide, an azo compound and the like, or active energy ray such as ultraviolet ray and electron ray is used. It is also possible to use a crosslinking agent having silicon hydride.

As the organic peroxide, there can be used those which are normally used in the crosslinking, such as ketone peroxide, peroxy ketal, hydroperoxide, dialkyl peroxide, diacyl peroxide and peroxy ester. Specific examples thereof include methyl ethyl ketone peroxide, cyclohexanone peroxide, 1,1-bis(t-butylperoxy)-3,3,5-trimethylcyclohexane, 2,2-bis(t-butylperoxy)octane, n-butyl-4,4-bis(t-butylperoxy)valerate, t-butyl hydroperoxide, cumene hydroperoxide, 2,5-dimethylhexane-2,5-dihydroperoxide, di-t-butyl peroxide, t-butylcumyl peroxide, dicumyl peroxide, α,α'-bis(t-butylperoxy-m-isopropyl)benzene, 2,5-dimethyl-2,5-di(t-butylperoxy)hexane, 2,5-dimethyl-2,5-di(t-butylperoxy) hexene, benzoylperoxide and t-butylperoxyisopropylcarbonate. The amount of the organic peroxide varies depending on the type of the organic peroxide, but it is normally within the range from 0.1 to 10% by weight based on the whole composition.

As the azo compound, there can be used those which are normally used in the crosslinking, such as an azonitrile compound, an azoamide compound and an azoamidine compound, and specific examples thereof include 2,2'-azobisisobutyronitrile, 2,2'-azobis(2-methylbutyronitrile), 2,2'-azobis(4-methoxy-2,4-dimethylvaleronitrile), 2,2'-azobis(2,4-dimethylvaleronitrile), 1,1'-azobis(cyclohexane-1-carbonitrile), 2-(carbamoylazo)isobutyronitrile, 2-phenylazo-4-methoxy-2,4-dimethyl-valeronitrile, 2,2'-azobis(2-methyl-N-phenylpropionamidine)dihydrochloride, 2,2'-azobis[N-(4-chlorophenyl)-2-methylpropionamidine] dihydrochlorde, 2,2'-azobis[N-hydroxyphenyl-2-methylpropionamidine]dihydrochloride, 2,2'-azobis[2-methyl-N-(phenylmethly)propionamidine]dihydrochloride, 2,2'-azobis[2-methyl-N-(2-propenyl)propionamidine] dihydrochloride, 2,2'-azobis(2-methyl-propionamidine) dihydrochloride, 2,2'-azobis[N-(2-hydroxyethyl)-2-methylpropionamidine]dihydrochloride, 2,2'-azobis[2-(5-methyl-2-imidazolin-2-yl)propane]dihydrochloride, 2,2'-azobis[2-(2-imidazolin-2-yl)propane]dihyrochioride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl)propane]dihydrochloride, 2,2'-azobis 2-[1-(2-hydroxyethyl)-2-imidazolin-2-yl]propane}dihydrochloride, 2,2'-azobis[2-(2-imidazolin-2-yl)propane], 2,2'-azobis{2-methyl-N-(1,1-bis(hydroxymethyl)-2-hydroxyethyl] propionamide}, 2,2'-azobis{2-methyl-N-[1,1-bis(hydroxymethyl)ethyl]propionamide}, 2,2'-azobis[2-methyl-N-(2-hydroxyethyl)propionamide], 2,2'-azobis(2-methylpropionamide)dihydrate, 2,2'-azobis(2,4,4-trimethylpentane), 2,2'-azobis(2-methylpropane), dimethyl 2,2'-azobisisobutyrate, 4,4'-azobis(4-cyanovaleric acid), and 2,2'-azobis[2-(hydroxymethyl) propionitrile]. The amount of the azo compound varies depending on the type of the azo compound, but is normally within the range from 0.1 to 10% by weight based on the whole composition.

In the crosslinking due to radiation of activated energy ray such as ultraviolet ray, glycidyl acrylate ether, glycidyl methacrylate ether and glycidyl cinnamate ether are particularly preferable among the monomer component represented by the formula (III-c). Furthermore, as the auxiliary sensitizer, there can be optionally used acetophenones such as diethoxyacetophenone, 2-hydroxy-2-methyl-1-phenylpropan-1-one, benzyldimethylketal, 1-(4-isopropylphenyl)-2-hydroxy-2-methylpropan-1-one, 4-(2-hydroxyethoxy)phenyl-(2-hydroxy-2-propyl)ketone, 2,2-dimethoxy-1,2-diphenylethan-1-one, 1-hydroxycyclohexylphenylketone and 2-methyl-2-morpholino(4-thiomethylphenyl)propan-1-one; benzoin ethers such as benzoin, benzoin methyl ether, benzoin ethyl ether, benzoin isopropyl ether, and benzoin isobutyl ether; benzophenones such as benzophenone, methyl o-benzoyl benzoate, 4-phenylbenzophenone, hydroxybenzophenone, 4-benzoyl-4'-methyl-diphenyl sulfide, alkylated benzophenone, 3,3',4,4'-tetra(t-butylperoxycarbonyl)benzophenone, 4-benzoyl-N,N-dimethyl-N-[2-(1-oxo-2-propenyloxy)ethyl] benzenemethanaminium bromide and (4-benzoylbenzyl) trimethylammonium chloride; thioxanthones such as 2-isopropylthioxanthone, 2,4-dimethylthioxanthone, 2,4-diethylthioxanthone and 2,4-dichlorothioxanthone; azides such as azidopyrene, 3-sulfonylazidobenzoic acid, 4-sulfonylazidobenzoic acid, 2,6-bis(4'-azidobenzal) cyclohexanone-2,2'-disulfonic acid (sodium salt), p-azidobenzaldehyde, p-azidoacetophenone, p-azidobenzoinic acid, p-azidobenzalacetophenone, p-azidobenzalacetone, 4,4'-diazidochalcone, 1,3-bis(4'-azidobenzal)acetone, 2,6-bis(4'-azidobenzal) cyclohexanone, 2,6-bis(4-azidobenzal)4-methylcyclohexanone, 4,4'-diazidostilbene-2,2'-disulfonic acid, 1,3-bis(4'-azidobenzal)-2-propanone-2'-sulfonic acid, and 1,3-bis(4'-azidocinnacylidene)-2-propanone.

As the auxiliary crosslinking agent for crosslinking reaction by ultraviolet ray, there can be optionally used ethylene glycol diacrylate, ethylene glycol dimethacrylate, oligoethylene glycol diacrylate, oligoethylene glycol dimethacrylate, propylene glycol diacrylate, propylene glycol dimethacrylate, oligopropylene glycol diacrylate, oligopropylene glycol dimethacrylate, 1,3-butylene glycol diacrylate, 1,4-butylene glycol diacrylate, 1,3-glycerol dimethacrylate, 1,1,1-trimethylolpropane dimethacrylate, 1,1,1-trimethylolethane diacrylate, pentaerythritoltrimethacrylate, 1,2,6-hexanetriacrylate, sorbitol pentamethacrylate, methylenebisacrylamide, methylenebismethacrylamide divinyl benzene, vinyl methacrylate, vinyl crotonate, vinyl acrylate, vinyl acetylene, trivinyl benzene, triallyl cyanyl sulfide, divinyl ether, divinyl sulfo ether, diallyl phthalate, glycerol trivinyl ether, allyl methacrylate, allyl acrylate, diallyl maleate, diallyl fumarate, diallyl itaconate, methyl methacrylate, butyl acrylate, ethyl acrylate, 2-ethylhexyl acrylate, lauryl methacrylate, ethylene glycol acrylate, triallyl isocyanurate, maleimide, phenylmaleimide, p-quinonedioxime, maleic anhydride, and itaconic acid.

As the compound having silicon hydride, which is used for crosslinking the ethylenically unsaturated group, a compound having at least two silicon hydrides are used. Particularly, a polysiloxane compound or a polysilane compound is preferable.

Examples of the polysiloxane compound include a linear polysiloxane compound represented by the formula (a-1) or (a-2), or a cyclic polysiloxane compound represented by the formula (a-3).

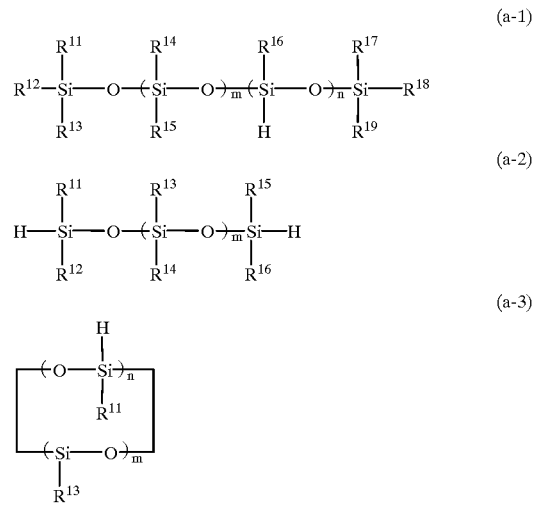

In the formulas (a-1) to (a-3), $R^{11}$, $R^{12}$, $R^{13}$, $R^{14}$, $R^{15}$, $R^{16}$, $R^{17}$, $R^{18}$ and $R^{19}$ respectively represent a hydrogen atom or an alkyl or alkoxy group having 1 to 12 carbon atoms; and $n \geq 2$, $m \geq 0$, $2 \leq n+m \leq 300$. As the alkyl group, a lower alkyl group such as a methyl group and an ethyl group is preferable. As the alkoxy group, a lower alkoxy group such as a methoxy group and ethoxy group is preferable.

As the silane compound, a linear silane compound represented by the formula (b-1) can be used.

In the formula (b-1), $R^{20}$, $R^{21}$, $R^{22}$, $R^{23}$ and $R^{24}$ respectively represent a hydrogen atom or an alkyl or alkoxy group having 1 to 12 carbon atoms; and $n \geq 2$, $m \geq 0$, $2 \leq m+n \leq 100$.

Examples of the catalyst of the hydrosilylation reaction include transition metals such as palladium and platinum or a compound or complex thereof. Furthermore, peroxide, amine and phosphine can also be used. The most popular catalyst includes dichlorobis(acetonitrile)palladium(II), chlorotris(triphenylphosphine)rhodium(I) and chloroplatic acid.

In the crosslinking method of the copolymer containing a halogen atom (e.g. a bromine atom or a iodine atom), for example, a crosslinking agent such as polyamienes, mercaptoimidazolines, mercaptopyrimidines, thioureas and polymercaptanes can be used. Examples of the polyamines include hexamethylenediamine carbamate, triethylenetetramine, tetraethylenepentamine, ethylenediamine carbamate, diethylenetriamine, dipropylenetriamine, dimethylaminopropylamine, diethylaminopropylamine, dibutylaminopropylamine, hexamethylenediamine, trimethylhexamethylenediamine, diaminophenyl sulfone, m-phenylenediamine, 2,4-toluylenediamine, m-toluylenediamine, o-toluylenediamine, and xylylenediamine. Examples of the mercaptoimidazolines include 2-mercaptoimidazoline, 4-methyl-2-mercaptoimidazoline, and 5-ethyl-4-butyl-2-mercaptoimidazoline. Examples of the mercaptopyrimidines include 2-mercaptopyrimidine, 4,6-dimethyl-2-mercaptopyrimidine, and 5-butyl-2-mercaptopyrimidine. Examples of the thioureas include thiourea, ethylene thiourea, dibutyl thiourea, trimethyl thiourea, triethyl thiourea, and tributyl thiourea. Examples of the polymercaptanes include 2-dibutylamino-4,6-dimethylcapto-s-triazine, 2-phenylamino-4,6-dimercaptotriazine, 2,5-dimercapto-1,3,4-thiazole, 1,10-decanedithiol, 2,3-dimercaptopyrazine, 2,3-dimercaptoquinoxaline, and 6-methylquinoxaline-2,3-dithiocarbonate. The amount of the crosslinking agent varies depending on the type of the crosslinking agent, but is normally within the range from 0.1 to 30% by weight based on the whole composition.

Furthermore, it is effective to add a metal compound as an acid acceptor to the composition of the present invention in view of the thermal stability of the halogen-containing polymer. Examples of the metal oxide as the acid acceptor include oxide, hydroxide, carbonate, carboxylate, silicate, borate, and phosphite of Group II metals of the Periodic Table; and oxide, basic carbonate, basic carboxylate, basic phosphite, basic sulfite, or tribasic sulfate of Group VIa metals of the Periodic Table. Specific examples thereof include magnesia, magnesium hydroxide, barium hydroxide, magnesium carbonate, barium carbonate, quick lime, slaked lime, calcium carbonate, calcium silicate, calcium stearate, zinc stearate, calcium phthalate, magnesium phosphite, calcium phosphite, zinc white, tin oxide, litharge, read lead, white lead, dibasic lead phthalate, dibasic lead carbonate, tin stearate, basic lead phosphite, basic tin phosphite, basic lead sulfite, and tribasic lead sulfate. The amount of the metal compound as the above acid acceptor varies depending on the type thereof, but is normally within the range from 0.1 to 30% by weight based on the whole composition.

The electrolyte salt compound used in the present invention is preferably soluble in a polyether copolymer of the present invention or a crosslinked material of said copolymer. In the present invention, the following salt compounds are preferably used.

That is, examples thereof include a compound composed of a cation selected from a metal cation, ammonium ion, amidinium ion and guanidium ion, and an anion selected from chlorine ion, bromine ion, iodine ion, perchlorate ion, thiocyanate ion, tetrafluoroborate ion, nitrate ion, $AsF_6^-$, $PF_6^-$, stearylsulfonate ion, octylsulfonate ion, dodecylbenzenesulfonate ion, naphthalenesufonate ion, dodecylnaphthalenesufonate ion, 7,7,8,8-tetracyano-p-quinodimethane ion, $X^1SO_3^-$, $(X^1SO_2)(X^2SO_2)N^-$, $(X^1SO_2)(X^2SO_2)(X^3SO_2)C^-$ and $(X^1SO_2)(X^2SO_2)YC^-$, wherein $X^1$, $X^2$, $X^3$ and Y respectively represent an electron attractive group. Preferably, $X^1$, $x^2$ and $X^3$ independently represent a perfluoroalkyl or perfluoroaryl group having 1 to 6 carbon atoms and Y represents a nitro group, a nitroso group, a carbonyl group, a carboxyl group or a cyano group. $X^1$, $X^2$ and $X^3$ may be the same or different. As the metal cation, a cation of a transition metal can be used. Preferably, a cation of a metal selected from Mn, Fe, Co, Ni, Cu, Zn and Ag metals is used. When using a cation of a metal selected from Li, Na, K, Rb, Cs, Mg, Ca and Ba metals, good results are also obtained. Two or more compounds described above may be used as the electrolyte salt compound.

In the present invention, the amount of the electrolyte salt compound is so that a value of a molar ratio of the number of moles of the electrolyte salt compound to the total number of moles of oxyethylene units (the total number of moles of oxyethylene units included in a main chain and side chain of the polyether copolymer) is preferably within the range from 0.0001 to 5, more preferably from 0.001 to 0.5. When this value exceeds 5, the processability and moldability, the mechanical strength and flexibility of the resulting solid electrolyte are deteriorated, and, furthermore, ionic conductivity is also deteriorated.

When using the polyether copolymer of the present invention, its crosslinked material, and crosslinked polymer solid electrolyte obtained from them, a flame retardant can be used when the flame retardance is required. That is, an effective amount of those selected from halide such as a brominated epoxy compound, tetrabromobisphenol A and a chlorinated paraffin, antimony trioxide, antimony pentaoxide, aluminum hydroxide, magnesium hydroxide, phosphate, polyphosphate and zinc borate as a flame retardant are added.

The method for production of the polymer solid electrolyte of the present invention is not specifically limited, but the polymer solid electrolyte can be normally produced by (1) a method of crosslinking a copolymer after mechanically mixing a copolymer and an electrolyte salt compound, or after mixing by dissolving a copolymer and an electrolyte salt compound in a solvent, followed by removal of the solvent; or (2) a method of crosslinking a copolymer, followed by mechanical mixing of the crosslinked copolymer and an electrolyte salt compound, or dissolving and mixing the crosslinked copolymer and an electrolyte salt compound in a solvent, and then removing the solvent. As means for mechanically mixing, various kneaders, open roll, extruder, etc. can be optionally used. When producing using a solvent, various polar solvents such as tetrahydrofuran, acetone, acetonitrile, dimethylformamide, dimethyl sulfoxide, dioxane, methyl ethyl ketone and methyl isobutyl ketone may be used alone or in combination thereof. The concentration of the solution is not specifically limited, but it is preferably from 1 to 50% by weight.

In case that the reactive functional group is a reactive silicon group, the amount of water used in the crosslinking reaction is not specifically limited because the crosslinking reaction easily occurs even in the presence of moisture in an atmosphere. The crosslinking can also be conducted by passing through a cold water or hot water bath for a short time, or exposing to a steam atmosphere.

In case of the copolymer wherein the reactive functional group is an epoxy group-containing group, when using a polyamine or an acid anhydride, the crosslinking reaction is completed at the temperature of 10 to 200° C. within 10 minutes to 20 hours.

In case of the copolymer wherein the reactive functional group is an ethylenically unsaturated group, when using a radical initiator, the crosslinking reaction is completed at the temperature of 10 to 200° C. within 1 minutes to 20 hours. Furthermore, when using energy ray such as ultraviolet ray, a sensitizer is normally used. The crosslinking reaction is normally completed at the temperature of 10 to 150° C. within 0.1 second to 1 hour. In case of the crosslinking agent having a silicon hydride, the crosslinking reaction is completed at the temperature of 10 to 180° C. within 10 minutes to 10 hours.

The copolymer of the present invention and the crosslinked material of the copolymer are a useful precursor for a polymer solid electrolyte. The polymer solid electrolyte is superior in mechanical strength and flexibility, and a large area thin-film shaped solid electrolyte can be easily obtained by utilizing the properties. For example, it is possible to make a battery by using the polymer solid electrolyte of the present invention. In this case, examples of a positive electrode material include lithium-manganese double oxide, lithium cobaltate, vanadium pentaoxide, polyacene, polypyrene, polyaniline, polyphenylene, polyphenylene sulfide, polyphenylene oxide, polypyrrole, polyfuran, and polyazulene. Examples of a negative electrode material include interlaminar compound prepared by occlusion of lithium between graphite or carbon layers, a lithium metal and a lithium-lead alloy. The crosslinked polymer solid electrolyte of the present invention can be used in a battery. By utilizing high ion conductivity, the crosslinked polymer solid electrolyte can also be used as a diaphragm of an ion electrode of the cation such as alkaline metal ion, Cu ion, Ca ion, and Mg ion. The polymer solid electrolyte of the present invention is particularly suitable as a material for electrochemical device such as a battery, a capacitor and a sensor.

PREFERRED EMBODIMENTS OF THE INVENTION

The following Examples further illustrate the present invention.

The composition (in terms of monomer) of the copolymer was analyzed by element analysis and $^1$H NMR spectrum. In case of the measurement of the molecular weight of the copolymer, the gel permeation chromatography measurement was conducted and the molecular weight was calculated in terms of standard polystyrene. The gel permeation chromatography measurement was conducted at 60° C. by a measuring device RID-6A manufactured by Shimadzu Corp., using a column manufactured by Showa Denko such as Showdex KD-807, KD-806, KD-806M and KD-803, and a solvent DMF. The glass transition temperature and fusion heat were measured in a nitrogen atmosphere within the temperature range from −100 to 80° C. at a heating rate of 10° C./min., using a differential scanning calorimeter DSC8230B manufactured by Rigaku Denki Co., Ltd. The measurement of the electrical conductivity a was conducted as follows. That is, a film vacuum-dried at 20° C. under 1 mm Hg for 72 hours was sandwiched between platinum electrodes and the conductivity was calculated according to the complex impedance method, using an A.C. method (voltage: 0.5 V, frequency: 5 Hz to 1 MHz). The flexibility of the solid electrolyte film was evaluated by the presence or absence of breakage in case of folding the film at an angle of 180 degrees at 25° C. Preparation Example (production of catalyst)

Tributyltin chloride (10 g) and tributyl phosphate (35 g) were charged in a three-necked flask equipped with a stirrer, a thermometer and a distillation device, and the mixture was heated at 250° C. for 20 minutes while stirring under a nitrogen stream and the distillate was distilled off to obtain a solid condensate as a residue product. In the following, this condensate was used as a polymerization catalyst.

EXAMPLE 1

After the atmosphere in a four-necked glass flask (internal volume: 3 L) was replaced by nitrogen, the condensate (1 g) obtained in the above Preparation Example as the catalyst, 3-glycidoxypropylmethyldimethoxysilane (2.13 g) having a water content adjusted to not more than 10 ppm, triethylene glycol glycidyl methyl ether (224 g) and n-hexane (980 g) as the solvent were charged in the flask, and ethylene oxide (40 g) was gradually added with monitoring the polymerization degree of triethylene glycol glycidyl methyl ether by gas chromatography. The polymerization was conducted at 20° C. for 10 hours. The polymerization reaction was terminated by using methanol. The polymer was isolated by decantation, dried at 40° C. under a normal pressure for 24 hours, and then dried at 45° C. under reduced pressure for 10 hours to obtain 220 g of a polymer. The glass transition temperature of this copolymer was −70° C., the number-average molecular weight was 400,000 and the fusion heat was 3 J/g. The results are shown in Table 1.

EXAMPLES 2 to 6

Using the monomers shown in Table 1, the same catalyst and operation as those of Example 1, the copolymerization was conducted. The results are shown in Table 1.

EXAMPLE 7

The polyether copolymer (1 g) obtained in Example 1 and a catalyst dibutyltin dilaurate (5 mg) were dissolved in tetrahydrofuran (20 ml) and water (10 μl) was added, followed by stirring for 15 minutes. After the solvent was removed under a normal pressure, the mixture was dried at 60° C. for 10 hours to obtain a crosslinked material. This crosslinked material was insoluble in an organic solvent, but it swelled in a solvent such as benzene and tetrahydrofuran.

EXAMPLE 8

The crosslinked material obtained in Example 7 (1 g) was impregnated with a tetrahydrofuran solution (5 ml) containing lithium perchlorate (100 mg) for 20 hours, heated and pressured at 160° C. and 20 KgW/cm$^2$ for 10 minutes to obtain a film. This film had flexibility and its conductivity was $1.5 \times 10^{-4}$ S/cm at 20° C. and $5.1 \times 10^{-4}$ S/cm at 60° C.

EXAMPLES 9 to 11

The polyether copolymer (1 g) obtained in Examples 1 to 3 was dissolved in tetrahydrofuran (20 ml), and the resulting solution was mixed with a tetrahydrofuran solution of lithium perchlorate so that a molar ratio of the number of moles of the soluble electrolyte salt compound to the total number of moles of ethylene oxide units was 0.05. Water was added to this mixed liquid under the condition that the amount in mol of water was three times that of the reactive silicon group-containing component. This mixed liquid was casted on a mold made of polytetarfluoroethylene, dried, heated and pressured at 160° C. and 20 KgW/cm$^2$ for 10 minutes to obtain a film. The results are shown in Table 2.

EXAMPLES 12 to 14

The polyether copolymer (1 g) obtained in Examples 4 to 6 and a dibutyltin dilaurate catalyst (5 mg) were dissolved in terahydrofuran (20 ml), and the resulting solution was mixed with a terahydrofuran solution of lithium perchlorate so that a molar ratio of the number of moles of the soluble electrolyte salt compound to the total number of moles of ethylene oxide units was 0.05 and water was added to this mixed solution in the same amount as that of the reactive silicon group-containing component. This mixed liquid was casted on a mold made of polytetarfluoroethylene, dried and then allowed to stand at 100° C. under an argon atmosphere for 3 hours to obtain a film. The results are shown in Table 2.

COMPARATIVE EXAMPLES 1 to 3

A copolymer having the structural units shown in Table 3 was synthesized in the same manner as in Example 1. In Comparative Examples 1 and 3, a film was obtained in the same manner as in Example 9. In Comparative Example 2, a film was obtained in the same manner as in Example 9, except for adding no water. The results were shown in Table 3.

It is apparent from a comparison with Comparative Examples that the ionic conductivity and mechanical characteristics of the crosslinked polymer solid electrolyte obtained from the polyether copolymer of the present invention are excellent.

EXAMPLE 15

Using the crosslinked polymer solid electrolyte obtained in Example 9 as the electrolyte, a lithium metal foil as the negative electrode and lithium cobaltate (LiCoO$_2$) as the positive electrode, a secondary battery was prepared. The size of the crosslinked polymer solid electrolyte was 10 mm×10 mm×1 mm. The size of the lithium foil was 10 mm×10 mm×0.1 mm. Lithium cobaltate was prepared by mixing predetermined amounts of lithium carbonate and cobalt carbonate powder and then calcining the mixture at 900° C. for 5 hours. The calcined mixture was ground, and then 12 parts by weight of acetylene black and 3 parts by weight of the crosslinked polymer solid electrolyte obtained in Example 9 were added to 85 parts by weight of the resulting lithium cobaltate, followed by mixing by a mortar and further press-molding under the pressure of 300 KgW/cm$^2$ to form a positive electrode having the size of 10 mm×10 mm×2 mm.

The crosslinked polymer solid electrolyte obtained in Example 9 was sandwiched between the lithium metal foil and the lithium cobaltate plate, and the charge/discharge characteristics of the resulting battery were examined with applying the pressure of 10 KgW/cm$^2$ so that the interfaces were brought into contact with each other. The discharge current at the initial terminal voltage of 3.2 V was 0.4 mA/cm$^2$ and the charging could be conducted at 0.3 mA/cm$^2$. It is possible to easily reduce the thickness of the battery in this Example and, therefore, a light-weight and large-capacity battery can be obtained.

TABLE 1

| | Example No. | | | | | |
|---|---|---|---|---|---|---|
| | 1 | 2 | 3 | 4 | 5 | 6 |
| Charged monomer (% by mol) | | | | | | |
| Monomer of the formula (1) | 52.5 | 11.95 | 9 | 10.95 | 10.9 | 15.9 |
| Ethylene oxide | 47 | 88 | 89 | 89 | 89 | 83.8 |
| 3-Glycidoxypropylmethyldimethoxysilane | 0.5 | | | | | 0.3 |
| 3-Glycidoxypropyltrimethoxysilane | | 0.05 | | 0.05 | 0.1 | |
| 2-(3,4-epoxycyclohexyl)ethyltrimethoxysilane | | | 2 | | | |
| Oxyethylene unit of the side chain portion of the formula (1) | | | | | | |
| Polymerization degree n | 3 | 4 | 2 | 2 | 8.5 | 2 |
| Substituent R' | —CH$_3$ | —CH$_3$ | —CH$_2$—CH=CH$_2$ | —(CH$_2$)$_3$—CH$_3$ | —CH$_3$ | (cyclohexyl) |
| Composition of formed copolymer (% by mol) | | | | | | |
| Monomer of the formula (1) | 49.5 | 9.95 | 8 | 9.95 | 9.9 | 14.7 |
| Ethylene oxide | 50 | 90 | 90 | 90 | 90 | 85 |
| 3-Glycidoxypropylmethyldimethoxysilane | 0.5 | | | | | 0.3 |
| 3-Glycidoxypropyltrimethoxysilane | | 0.05 | | 0.05 | 0.1 | |
| 2-(3,4-epoxycyclohexyl)ethyltrimethoxysilane | | | 2 | | | |
| Number-average molecular weight of copolymer | 400,000 | 580,000 | 330,000 | 400,000 | 170,000 | 390,000 |
| Glass transition point of copolymer (° C.) | −70 | −67 | −67 | −68 | −63 | −61 |
| Fusion heat of copolymer (J/g) | 3 | 42 | 38 | 14 | 10 | 7 |

Note: Monomer of the formula (1):

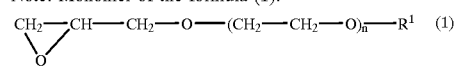

TABLE 2

| | Example No. | | | | | |
|---|---|---|---|---|---|---|
| | 9 | 10 | 11 | 12 | 13 | 14 |
| Used copolymer | Example 1 | Example 2 | Example 3 | Example 4 | Example 5 | Example 6 |
| Flexibility of solid electrolyte film | Not broken | Not broken | Not broken | Not broken | Not broken | Not broken |
| Conductivity of solid electrolyte film (S/cm) | | | | | | |
| 20° C. | $2.8 \times 10^{-4}$ | $4.5 \times 10^{-4}$ | $0.3 \times 10^{-4}$ | $0.2 \times 10^{-4}$ | $2.1 \times 10^{-4}$ | $0.1 \times 10^{-4}$ |
| 60° C. | $8.9 \times 10^{-4}$ | $9.2 \times 10^{-4}$ | $4.8 \times 10^{-4}$ | $2.8 \times 10^{-4}$ | $7.3 \times 10^{-4}$ | $1.8 \times 10^{-4}$ |

TABLE 3

| | Comparative Example No. | | |
|---|---|---|---|
| | 1 | 2 | 3 |
| Composition of formed copolymer (% by mol) | | | |
| Repeating unit of formula (1) | | 10 | 10 |
| Ethylene oxide | 99.5 | 90 | 70 |
| 3-Glycidoxypropyltrimethoxysilane | 0.5 | | 20 |
| Oxyethylene unit of the side chain portion of the formula (1) | | | |
| Polymerization degree n | | 2 | 2 |
| Substituent R' | | —CH$_3$ | —CH$_3$ |
| Number-average molecular weight of copolymer | 980,000 | 300,000 | insoluble in solvent |
| Glass transition point of copolymer (° C.) | −60 | −68 | impossible to measure |
| Fusion heat of copolymer (J/g) | 160 | 40 | |
| Flexibility of solid electrolyte film | Not broken | Not broken | impossible to form film |
| Conductivity of solid electrolyte film (S/cm) | | | |
| 20° C. | $1.5 \times 10^{-6}$ | $4.5 \times 10^{-4}$ | impossible to measure |
| 60° C. | $8.0 \times 10^{-6}$ | difficult to measure because of plastic deformation | impossible to measure |

EXAMPLE 16

After the atmosphere in a four-necked glass flask (internal volume: 3 L) was replaced by nitrogen, the condensate (1 g) of Preparation Example as the catalyst, 2,3-epoxypropyl-2', 3'-epoxy-2'-methyl propyl ether (10.47 g) having a water content adjusted to not more than 10 ppm, triethylene glycol glycidyl methyl ether (184 g) and n-hexane (900 g) as the solvent were charged in the flask, and ethylene oxide (40 g) was gradually added with monitoring the polymerization degree of triethylene glycol glycidyl methyl ether by gas chromatography. The polymerization reaction was conducted at 20° C. for 8 hours. The polymerization reaction was terminated by using methanol. The polymer was isolated by decantation, dried at 40° C. under a normal pressure for 24 hours, and then dried at 45° C. under reduced pressure for 10 hours to obtain 195 g of a polymer. The glass transition temperature of this polymer was −70° C., the number-average molecular weight was 320,000 and the fusion heat was 3 J/g. The results of the composition analysis (in terms of monomer) of this polymer by $^1$H NMR spectrum are as shown in Example 16 of Table 4.

EXAMPLES 17 to 21

Using the monomer shown in Table 4, the same catalyst and operation as those of Example 16, the copolymerization was conducted. The results are shown in Table 4.

EXAMPLE 22

The polyether copolymer (1 g) obtained in Example 16 and diethylenetriamine (50 mg) were dissolved in tetrahydrofuran (20 ml), and then the reaction was conducted at 40° C. for 2 hours. After the solvent was removed under reduced pressure, dried at 60° C. for 6 hours to obtain a crosslinked material. This crosslinked material was insoluble in an organic solvent, but it swelled in a solvent such as benzene and tetrahydrofuran.

EXAMPLE 23

The crosslinked material (1 g) obtained in Example 22 was impregnated with a tetrahydrofuran solution (5 ml) containing lithium perchlorate (100 mg) for 20 hours, heated and pressured at 160° C. and 20 KgW/cm$^2$ for 10 minutes to obtain a film. This film had flexibility and its conductivity was $1.3 \times 10^{-4}$ S/cm at 20° C. and $4.6 \times 10^{-4}$ S/cm at 60° C.

EXAMPLES 24 to 26

The polyether copolymer (1 g) in Example 16 to 18 polymerized by using the organotin-phosphate ester condensate catalyst and maleic anhydride (150 mg) were dissolved in terahydrofuran (20 ml), and the resulting solution was mixed with a terahydrofuran solution of lithium perchlorate so that a molar ratio of the number of moles of the soluble electrolyte salt compound to the total number of moles of ethylene oxide units was 0.05. This mixed liquid was casted on a mold made of polytetarfluoroethylene, dried and then heated and pressured at 160° C. and 20 KgW/cm$^2$ for one hour to obtain a film. The results are shown in Table 5.

EXAMPLES 27 to 29

The polyether copolymer (1 g) in Example 19 to 21 and diethylenetriamine (50 mg) were dissolved in terahydrofuran (20 ml), and the resulting solution was mixed with a terahydrofuran solution of lithium perchlorate so that a molar ratio of the number of moles of the soluble electrolyte salt compound to the total number of moles of ethylene oxide units was 0.05. This mixed liquid was casted on a mold made of polytetarfluoroethylene, dried and then allowed to stand at 100° C. under an argon atmosphere for 10 hours to obtain a film. The results are shown in Table 2.

COMPARATIVE EXAMPLES 4 to 6

Using the polyether copolymer shown in Table 6 obtained in the same manner as in Example 16, a film molding was conducted. In Comparative 4 and 6, a film was obtained in the same manner as in Example 24. In Comparative Example 5, a film molding was conducted as obtained in the same manner as in Example 9, except for adding no crosslinking agent.

It is apparent from a comparison with Comparative Examples that the ionic conductivity and mechanical characteristics of the crosslinked polymer solid electrolyte obtained from the polyether copolymer of the present invention are excellent.

EXAMPLE 30

Using the crosslinked polymer solid electrolyte obtained in Example 24 as the electrolyte, a lithium metal foil as the negative electrode and lithium cobaltate ($LiCoO_2$) as the positive electrode, a secondary battery was prepared. The size of the crosslinked polymer solid electrolyte was 10 mm×10 mm×1 mm. The size of the lithium foil was 10 mm×10 mm×0.1 mm. Lithium cobaltate was prepared by mixing predetermined amounts of lithium carbonate and cobalt carbonate powder and then calcining the mixture at 900° C. for 5 hours. The calcined mixture was ground, and then 12 parts by weight of acetylene black and 3 parts by weight of the crosslinked polymer solid electrolyte obtained in Example 24 were added to 85 parts by weight of the resulting lithium cobaltate, followed by mixing by a mortar and further press-molding under the pressure of 300 KgW/$cm^2$ to form a positive electrode having the size of 10 mm×10 mm×2 mm.

The crosslinked polymer solid electrolyte obtained in Example 24 was sandwiched between the lithium metal foil and the lithium cobaltate plate, and the charge/discharge characteristics of the resulting battery were examined with applying the pressure of 10 KgW/$cm^2$ so that the interfaces were brought into contact with each other. The discharge current at the initial terminal voltage of 3.2 V was 0.4 mA/$cm^2$ and the charging could be conducted at 0.3 mA/$cm^2$. It is possible to easily reduce the thickness of the battery in this Example and, therefore, a light-weight and large-capacity battery can be obtained.

TABLE 4

|  | Example No. | | | | | |
| --- | --- | --- | --- | --- | --- | --- |
|  | 16 | 17 | 18 | 19 | 20 | 21 |
| Charged monomer (% by mol) | | | | | | |
| Monomer of the formula (1) | 46 | 11 | 10 | 15 | 9 | 5 |
| Ethylene oxide | 50 | 85 | 86 | 77 | 89 | 88 |
| 2,3-epoxypropyl-2',3'-epoxy-2'-methyl propyl ether | 4 |  |  |  | 2 |  |
| Diethylene glycol 2,3-epoxypropyl-2',3'-epoxy-2'-methyl propyl ether |  |  |  | 8 |  | 7 |
| 2-methyl-1,2,3,4-diepoxyethane |  |  | 4 |  |  |  |
| Catechol-2,3-epoxypropyl-2',3'-epoxy-2'-methyl propyl ether |  | 4 |  |  |  |  |
| Oxyethylene unit of the side chain portion of the formula (1) | | | | | | |
| Polymerization degree n | 3 | 4 | 3 | 2 | 8.5 | 2 |
| Substituent R' | —$CH_3$ | —$CH_3$ | —$CH_2$—CH=$CH_2$ | —$(CH_2)_3$—$CH_3$ | —$CH_3$ | 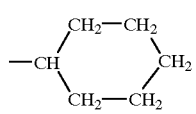 |
| Formed copolymer (% by mol) | | | | | | |
| Monomer of the formula (1) | 45 | 10 | 12 | 15 | 9 | 5 |
| Ethylene oxide | 52 | 86 | 85 | 78 | 89 | 89 |
| 2,3-epoxypropyl-2',3'-epoxy-2'-methyl propyl ether | 4 |  |  |  | 2 |  |
| Diethylene glycol 2,3-epoxypropyl-2',3'-epoxy-2'-methyl propyl ether |  |  |  | 7 |  | 6 |
| 2-methyl-1,2,3,4-diepoxyethane |  |  | 3 |  |  |  |
| Catechol-2,3-epoxypropyl-2',3'-epoxy-2'-methyl propyl ether |  | 4 |  |  |  |  |
| Number-average molecular weight of copolymer | 320,000 | 380,000 | 350,000 | 280,000 | 160,000 | 260,000 |

TABLE 4-continued

| | Example No. | | | | | |
|---|---|---|---|---|---|---|
| | 16 | 17 | 18 | 19 | 20 | 21 |
| Glass transtion point of copolymer (° C.) | −70 | −67 | −67 | −68 | −62 | −60 |
| Fusion heat of copolymer (J/g) | 3 | 29 | 39 | 13 | 12 | 13 |

Note: Monomer of the formula (1):

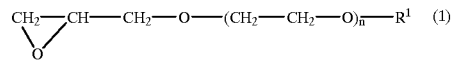

TABLE 5

| | Example No. | | | | | |
|---|---|---|---|---|---|---|
| | 24 | 25 | 26 | 27 | 28 | 29 |
| Used copolymer | Example 16 | Example 17 | Example 18 | Example 19 | Example 20 | Example 21 |
| Composition of copolymer (% by mol) | | | | | | |
| Flexibility of solid electrolyte film | Not broken | Not broken | Not broken | Not broken | Not broken | Not broken |
| Conductivity of solid electrolyte film (S/cm) | | | | | | |
| 20° C. | $2.8 \times 10^{-4}$ | $6.5 \times 10^{-4}$ | $1.2 \times 10^{-4}$ | $3.2 \times 10^{-4}$ | $1.9 \times 10^{-4}$ | $9.1 \times 10^{-5}$ |
| 60° C. | $8.9 \times 10^{-4}$ | $9.8 \times 10^{-4}$ | $5.0 \times 10^{-4}$ | $6.8 \times 10^{-4}$ | $6.8 \times 10^{-4}$ | $1.2 \times 10^{-4}$ |

TABLE 6

| | Comparative Example No. | | |
|---|---|---|---|
| | 4 | 5 | 6 |
| Composition of copolymer (% by mol) | | | |
| Repeating unit of formula (1) | | 10 | 10 |
| Ethylene oxide | 96 | 90 | 60 |
| 2,3-epoxypropyl-2',3'-epoxy-2'-methyl propyl ether | 4 | | 30 |
| Oxyethylene unit of the side chain portion of the formula (1) | | | |
| Polymerization degree n | 2 | 2 | 2 |
| Substituent R' | —CH$_3$ | —CH$_3$ | —CH$_3$ |
| Number-average molecular weight of copolymer | 900,000 | 300,000 | insoluble in solvent |
| Glass transition point of copolymer (° C.) | −60 | −68 | impossible to measure |
| Fusion heat of copolymer (J/g) | 162 | 40 | |
| Flexibility of solid electrolyte film | Not broken | Not broken | impossible to form film |
| Conductivity of solid electrolyte film (S/cm) | | | |
| 20° C. | $1.3 \times 10^{-6}$ | $4.5 \times 10^{-4}$ | impossible to measure |
| 60° C. | $8.6 \times 10^{-6}$ | difficult to measure because of plastic deformation | impossible to measure |

Note: Monomer of the formula (1): $CH_2$—CH—$CH_2$—O—($CH_2$—$CH_2$—O)$_n$—R$^1$ (1)

EXAMPLES 31 to 37 AND COMPARATIVE EXAMPLES 7 to 9

The polyether copolymer (1 g) in Table 7 and 8 polymerized by using the organotin-phosphate ester condensate catalyst and dicumyl peroxide (a crosslinking agent) (0.015 g) were dissolved in terahydrofuran (20 ml), and the resulting solution was mixed with a terahydrofuran solution of lithium perchlorate so that a molar ratio of the number of moles of the soluble electrolyte salt compound to the total number of moles of ethylene oxide units was 0.05. This mixed liquid was casted on a mold made of polytetarfluoroethylene, dried and then heated and pressured at 160° C. and 20 KgW/cm$^2$ for 10 minutes to obtain a film.

EXAMPLE 38

The polyether copolymer (1 g) shown in Table 7 and 1,1-bis(t-butylperoxy)-3,3,5-trimethylcyclohexane (a crosslinking agent) (0.02 g) were dissolved in terahydrofuran (20 ml), and the resulting solution was mixed with a terahydrofuran solution of lithium perchlorate so that a molar ratio of the number of moles of the soluble electrolyte salt compound to the total number of moles of ethylene oxide units was 0.05. This mixed liquid was casted on a mold made of polytetarfluoroethylene, dried and then heated and pressured at 145° C. and 20 KgW/cm² for 10 minutes to obtain a film.

EXAMPLE 39

The polyether copolymer (1 g) shown in Table 7 and benzoyl peroxide (a crosslinking agent) (0.02 g) were dissolved in terahydrofuran (20 ml), and the resulting solution was mixed with a terahydrofuran solution of lithium perchlorate so that a molar ratio of the number of moles of the soluble electrolyte salt compound to the total number of moles of ethylene oxide units was 0.05. This mixed liquid was casted on a mold made of polytetarfluoroethylene, dried and then heated and pressured at 80° C. and 20 KgW/cm² for 5 hours to obtain a film.

EXAMPLE 40

The polyether copolymer (1 g) shown in Table 7 and dicumyl peroxide (a crosslinking agent) (0.015 g) were dissolved in acetonitrile (20 ml), and the resulting solution was mixed with an acetonitrile solution of lithium bistrifluoromethanesulfonylimide so that a molar ratio of the number of moles of the soluble electrolyte salt compound to the total number of moles of ethylene oxide units was 0.05, and then a film was obtained in the same manner as in EXAMPLES 31 to 37.

EXAMPLE 41

The polyether copolymer (1 g) shown in Table 7 and azobisisobutyronitrile (a crosslinking agent) (0.02 g) were dissolved in terahydrofuran (20 ml), and the resulting solution was mixed with a terahydrofuran solution of lithium perchlorate so that a molar ratio of the number of moles of the soluble electrolyte salt compound to the total number of moles of ethylene oxide units was 0.05. This mixed liquid was casted on a mold made of polytetarfluoroethylene, dried and then allowed to stand at 100° C. under an argon atmosphere for 2 hours to obtain a film.

EXAMPLE 42

The polyether copolymer (1 g) shown in Table 7 and 2,2-dimethoxy-1,2-diphenylethan-1-one (a sensitizer) (0.02 g) were dissolved in terahydrofuran (20 ml), and the resulting solution was mixed with a terahydrofuran solution of lithium perchlorate so that a molar ratio of the number of moles of the soluble electrolyte salt compound to the total number of moles of ethylene oxide units was 0.05. This mixed liquid was casted on a mold made of polytetarfluoroethylene and dried, followed by ultraviolet ray irradiation (30 mW/cm², 360 nm) under an argon atmosphere for 10 minutes to obtain a film.

EXAMPLE 43

The polyether copolymer (1 g) shown in Table 7 and a polysiloxane (0.2 g) represented by the formula (11) were dissolved in toluene (10 ml) and an isopropyl alcohol solution containing 1% by weight of chloroplatinic acid was added, and the resulting solution was mixed with a toluene solution of lithium bistrifluoromethanesulfonylimide so that a molar ratio of the number of moles of the soluble elec- trolyte salt compound to the total number of moles of ethylene oxide units was 9.05, and then a film was obtained in the same manner as in Examples 31 to 37. In the formula (11), Mn represents a number-average molecular weight (The same also in the following formulas (12) and (13)).

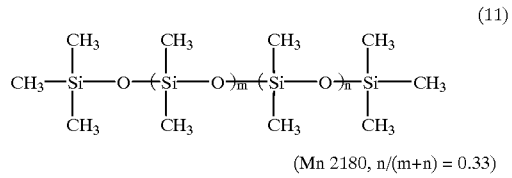

EXAMPLE 44

The polyether copolymer (1 g) shown in Table 7 and a polysiloxane (0.2 g) represented by the formula (12) were dissolved in toluene (10 ml) and an isopropyl alcohol solution containing 1% by weight of chloroplatinic acid was added, and the resulting solution was mixed with a toluene solution of lithium bistrifluoromethanesulfonylimide so that a molar ratio of the number of moles of the soluble electrolyte salt compound to the total number of moles of ethylene oxide units was 0.05, and then a film was obtained in the same manner as in Examples 31 to 37.

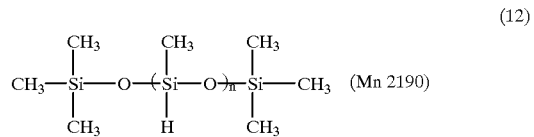

EXAMPLE 45

The polyether copolymer (1 g) shown in Table 7 and a polysiloxane (0.2 g) represented by the formula (13) were dissolved in toluene (10 ml) and an isopropyl alcohol solution containing 1% by weight of chloroplatinic acid was added, and the resulting solution was mixed with a toluene solution of lithium bistrifluoromethanesulfonylimide so that a molar ratio of the number of moles of the soluble electrolyte salt compound to the total number of moles of ethylene oxide units was 0.05, and then a film was obtained in the same manner as in Examples 31 to 37.

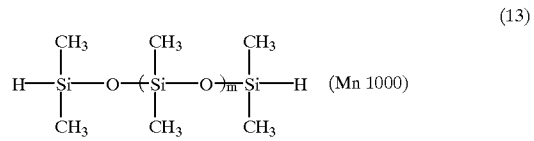

EXAMPLE 46

The polyether copolymer (1 g) shown in Table 7 and a polyhydrosilane (n=8) (0.2 g) represented by the formula (14) were dissolved in toluene (10 ml) and an isopropyl alcohol solution containing 1% by weight of chloroplatinic acid was added, and the resulting solution was mixed with a toluene solution of lithium bistrifluoromethanesulfonylimide so that a molar ratio of the number of moles of the soluble electrolyte salt compound to the total number of moles of ethylene oxide units was 0.05, and then a film was obtained in the same manner as in Examples 31 to 37.

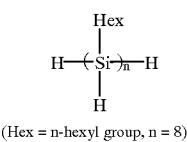

(14)

(Hex = n-hexyl group, n = 8)

COMPARATIVE EXAMPLES 10 AND 11

Using the polyether copolymer shown in Table 8 polymerized by using the organotin-phosphate ester condensate catalyst, without adding no crosslinking agent, a film was obtained in the same manner as in Examples 31 to 37.

COMPARATIVE EXAMPLE 12

The monomer components shown in Table 8 and an aqueous 48% KOH solution were stirred at 120° C. in an autoclave for 2 hours. Then, using the polymerized polyether copolymer (1 g) and dicumyl peroxide (a crosslinking agent) (0.03 g), a film was obtained in the same manner as in Examples 31 to 37.

The results of Example 31 to 46 and Comparative Example 7 to 12 are described in Table 7 and 8. In Table 7 and 8, the glass transition point and fusion heat were measured in a nitrogen atmosphere within the temperature range from −100 to 80° C. at a heating rate of 10° C./min., using a differential scanning calorimeter DSC8230B manufactured by Rigaku Denki Co., Ltd. The measurement of the conductivity a was conducted as follows. That is, a film vacuum-dried at 20° C. under 1 mm Hg for 72 hours was sandwiched between platinum electrodes and the conductivity was calculated according to the complex impedance method, using an A.C. method (voltage: 0.5 V, frequency: 5 Hz to 1 MHz). The flexibility of the solid electrolyte film was evaluated by the presence or absence of breakage in case of folding the film at an angle of 180 degrees.

EXAMPLE 47

Using the crosslinked polymer solid electrolyte obtained in Example 33 as the electrolyte, a lithium metal foil as the negative electrode and lithium cobaltate ($LiCoO_2$) as the positive electrode, a secondary battery was prepared. The size of the crosslinked polymer solid electrolyte was 10 mm×10 mm×1 mm. The size of the lithium foil was 10 mm×10 mm×0.1 mm. Lithium cobaltate was prepared by mixing predetermined amounts of lithium carbonate and cobalt carbonate powder and then calcining the mixture at 900° C. for 5 hours. The calcined mixture was ground, and then 12 parts by weight of acetylene black and 3 parts by weight of the crosslinked polymer solid electrolyte obtained in Example 33 were added to 85 parts by weight of the resulting lithium cobaltate, followed by mixing by a mortar and further press-molding under the pressure of 300 KgW/$cm^2$ to form a positive electrode having the size of 10 mm×10 mm×2 mm.

The crosslinked polymer solid electrolyte obtained in Example 33 was sandwiched between the lithium metal foil and the lithium cobaltate plate, and the charge/discharge characteristics of the resulting battery were examined with applying the pressure of 10 KgW/$cm^2$ so that the interfaces were brought into contact with each other. The discharge current at the initial terminal voltage of 3.2 V was 0.4 mA/$cm^2$ and the charging could be conducted at 0.3 mA/$cm^2$. It is possible to easily reduce the thickness of the battery in this Example and, therefore, a light-weight and large-capacity battery can be obtained.

TABLE 7

| | Example No. | | | | | | |
|---|---|---|---|---|---|---|---|
| | 31 | 32 | 33 | 34 | 35 | 36 | 37 |
| Composition of formed copolymer (% by mol) | | | | | | | |
| Monomer component of formula (1) | 98 | 44.5 | 9 | 51 | 49 | 8 | |
| Ethylene oxide | 0 | 55 | 90 | 48 | 50 | 90 | 94 |
| Allyl glycidyl ether | 2 | 0.5 | 1 | 1 | 1 | | |
| Glycidyl methacrylate | | | | | | 2 | |
| Tetraethylene glycol glycidyl ether acrylate | | | | | | | 6 |
| Polymerization degree n of oxyethylene unit of the side chain portion of the formula (1) | 2 | 2 | 2 | 3 | 8.5 | 2 | 2 |
| Number-average molecular weight of copolymer | 200,000 | 300,000 | 350,000 | 250,000 | 300,000 | 800,000 | 400,000 |
| Glass transition point of copolymer (° C.) | −74 | −71 | −67 | −71 | −70 | −66 | −63 |
| Fusion heat of copolymer (J/g) | 0 | 0 | 47 | 0 | 3 | 44 | 56 |
| Flexibility of solid electrolyte film | Not broken | Not broken | Not broken | Not broken | Not broken | Not broken | Not broken |
| Conductivity of solid electrolyte film (S/cm) | | | | | | | |
| 20° C. | $3.1 \times 10^{-4}$ | $3.0 \times 10^{-4}$ | $1.6 \times 10^{-4}$ | $3.5 \times 10^{-4}$ | $3.2 \times 10^{-4}$ | $1.1 \times 10^{-4}$ | $6.5 \times 10^{-5}$ |
| 60° C. | $2.0 \times 10^{-3}$ | $1.8 \times 10^{-3}$ | $9.5 \times 10^{-4}$ | $2.5 \times 10^{-3}$ | $2.0 \times 10^{-4}$ | $8.9 \times 10^{-4}$ | $5.2 \times 10^{-4}$ |

| | Example No. | | | | | | | | |
|---|---|---|---|---|---|---|---|---|---|
| | 38 | 39 | 40 | 41 | 42 | 43 | 44 | 45 | 46 |
| Composition of formed copolymer (% by mol) | | | | | | | | | |
| Monomer component of formula (1) | 9 | 9 | 9 | 12 | 10 | 20 | 20 | 20 | 20 |
| Ethylene oxide | 90 | 90 | 90 | 87 | 89 | 77 | 77 | 77 | 77 |
| Allyl glycidyl ether | 1 | 1 | 1 | 1 | | 3 | 3 | 3 | 3 |

TABLE 7-continued

| | | | | | | | | | |
|---|---|---|---|---|---|---|---|---|---|
| Glycidyl methacrylate | | | | | 1 | | | | |
| Polymerization degree n of oxyethylene unit of the side chain portion of the formula (1) | 2 | 2 | 2 | 2 | 2 | 3 | 3 | 3 | 3 |
| Number-average molecular weight of copolymer | 350,000 | 350,000 | 350,000 | 350,000 | 500,000 | 250,000 | 250,000 | 250,000 | 250,000 |
| Glass transition point of copolymer (° C.) | −67 | −67 | −67 | −68 | −66 | −70 | −70 | −70 | −70 |
| Fusion heat of copolymer (J/g) | 47 | 47 | 47 | 30 | 42 | 12 | 12 | 12 | 12 |
| Flexibility of solid electrolyte film | Not broken | Not broken | Not broken | Not broken | Not broken | Not broken | Not broken | Not broken | Not broken |
| Conductivity of solid electrolyte film (S/cm) | | | | | | | | | |
| 20° C. | $1.4 \times 10^{-4}$ | $1.6 \times 10^{-4}$ | $3.1 \times 10^{-4}$ | $2.8 \times 10^{-4}$ | $2.5 \times 10^{-4}$ | $5.8 \times 10^{-4}$ | $5.1 \times 10^{-4}$ | $4.7 \times 10^{-4}$ | $3.5 \times 10^{-4}$ |
| 60° C. | $9.3 \times 10^{-4}$ | $9.0 \times 10^{-4}$ | $1.0 \times 10^{-3}$ | $1.9 \times 10^{-3}$ | $1.8 \times 10^{-3}$ | $2.2 \times 10^{-3}$ | $2.0 \times 10^{-3}$ | $2.0 \times 10^{-3}$ | $1.9 \times 10^{-3}$ |

Note: Monomer of the formula (1):

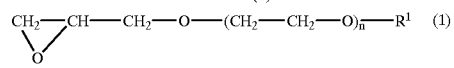

$$CH_2\text{—}CH\text{—}CH_2\text{—}O\text{—}(CH_2\text{—}CH_2\text{—}O)_{\overline{n}}\text{—}R^1 \quad (1)$$
(with epoxide on CH_2—CH)

TABLE 8

| | Comparative Example No. | | | | | |
|---|---|---|---|---|---|---|
| | 7 | 8 | 9 | 10 | 11 | 12 |
| Composition of formed copolymer (% by mol) | | | | | | |
| Repeating unit of formula (1) | | | | 100 | 10 | 7 |
| Ethylene oxide | 62 | 98 | 56 | | 90 | 86 |
| Allyl glycidyl ether | 38 | 2 | 2 | | | 7 |
| Epichlorohydrin | | | 42 | | | |
| Polymerization degree n of oxyethylene unit of the side chain portion of the formula (1) | | | | 2 | 2 | 2 |
| Number-average molecular weight of copolymer | 150,000 | 950,000 | 200,000 | 100,000 | 300,000 | 5,000 |
| Glass transition point of copolymer (° C.) | −71 | −62 | −48 | −74 | −68 | −69 |
| Fusion heat of copolymer (J/g) | 0 | 153 | 0 | 0 | 40 | 25 |
| Flexibility of solid electrolyte film | Broken | Not broken | Not broken | Liquid state | Not broken | Broken |
| Conductivity of solid electrolyte film (S/cm) | | | | | | |
| 20° C. | $4.9 \times 10^{-6}$ | $1.8 \times 10^{-6}$ | $3.8 \times 10^{-6}$ | Liquid state | $4.5 \times 10^{-4}$ | $3.8 \times 10^{-5}$ |
| 60° C. | $3.0 \times 10^{-5}$ | $9.4 \times 10^{-6}$ | $2.4 \times 10^{-5}$ | Liquid state | Difficult to measure because of plastic deformation | $1.1 \times 10^{-4}$ |

Note: Monomer of the formula (1):

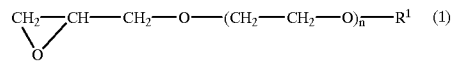

$$CH_2\text{—}CH\text{—}CH_2\text{—}O\text{—}(CH_2\text{—}CH_2\text{—}O)_{\overline{n}}\text{—}R^1 \quad (1)$$

EXAMPLE 48

After the atmosphere in a four-necked glass flask (internal volume: 3 L) was replaced by nitrogen, the condensate (1 g) of Preparation Example as the catalyst, epibromohydrin $$CH_2\text{-}CH\text{—}CH_2\text{—}Br$$
(with epoxide ring on CH_2-CH, O)

(20 g) having a water content adjusted to not more than 10 ppm, triethylene glycol glycidyl methyl ether (212 g) and n-hexane (1,000 g) as the solvent were charged in the flask, and ethylene oxide (110 g) was gradually added with monitoring the polymerization degree of triethylene glycol glycidyl methyl ether by gas chromatography. The polymerization reaction was terminated by using methanol. The polymer was isolated by decantation, dried at 40° C. under a normal pressure for 24 hours, and then dried at 45° C. under reduced pressure for 10 hours to obtain 298 g of a polymer. The composition (in terms of monomer) of the polymer by $^1$H NMR spectrum and measurement of the bromine content was determined.

| Charged monomer (% by mol) | |
|---|---|
| Ethylene oxide | 70 |
| Triethylene glycol glycidyl methyl ether | 27 |
| Epibromohydrin | 4 |
| Formed copolymer (% by mol) | |
| Ethylene oxide | 72 |
| Triethylene glycol glycidyl methyl ether | 25 |
| Epibromohydrin | 3 |
| Number-average molecular weight of copolymer: | 370,000 |
| Glass transition point of copolymer (° C.): | −69 |
| Fusion heat of copolymer (J/g): | 18 |

EXAMPLE 49

The copolymer (1 g) obtained in Example 48, ethylene thiourea (a crosslinking agent) (0.015 g) and dibasic lead phthalate (0.05 g) were dissolved in acetonitrile (20 ml), and the resulting solution was mixed with an acetonitrile solution of lithium perchlorate so that a molar ratio of (the number of moles of the soluble electrolyte salt compound) to (the total number of moles of ethylene oxide units) was 0.07. This mixed liquid was casted on a mold made of polytetarfluoroethylene, dried and then heated and pressured at 170° C. and 60 KgW/cm² for 15 minutes to obtain a film.

Flexibility of solid electrolyte film: Not broken
Conductivity of solid electrolyte film (S/cm):
  20(° C.) $2.8 \times 10^{-4}$
  60(° C.) $1.2 \times 10^{-3}$

EFFECT OF THE INVENTION

The polymer solid electrolyte of the present invention is superior in processability, moldability, mechanical strength, flexibility, heat resistance and the like and the ionic conductivity is remarkably improved. Accordingly, it can be applied to electronic apparatuses such as a large-capacity condenser and a display device (e.g. an electrochromic display), including solid batteries.

What is claimed is:

1. A polyether copolymer having a number-average molecular weight of 50,000 to 2,000,000, a glass transition temperature measured by a differential scanning calorimeter (DSC) of not more than −60° C. and a fusion heat of not more than 70 J/g, comprising:

(A) 1 to 98% by mol of a repeating unit derived from a monomer represented by the formula (I):

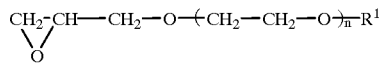

(I)

wherein $R^1$ is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atoms and a tetrahydropyranyl group, and n is from 1 to 12;

(B) 95 to 1% by mol of a repeating unit derived from a monomer represented by the formula (II):

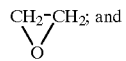

(II)

(C) 0.005 to 15% by mol of a repeating unit derived from a monomer having one epoxy group and at least one reactive functional group which is selected from the group consisting of (a) a reactive silicon group, (b) an epoxy group, (c) an ethylenically unsaturated group and (d) a halogen atom,
  wherein the copolymer is a random copolymer, and the monomer from which the repeating unit (C) is derived is other than allyl glycidyl ether.

2. The copolymer according to claim 1, wherein the reactive functional group in the repeating unit (C) is an ethylenically unsaturated group selected from the group consisting of acryl and methacryl group.

3. The copolymer according to claim 1, wherein the repeating unit (C) is derived from a monomer of the formula (III-1) or (III-2):

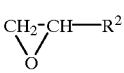

(III-1)

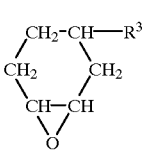

(III-2)

wherein $R^2$ and $R^3$ represent a group having a reactive functional group.

4. The copolymer according to claim 1, wherein the monomer, which constitutes the repeating unit (C), having a reactive silicon group, is represented by the formula (III-a-1-1), (III-a-1-2) or (III-a-2-1):

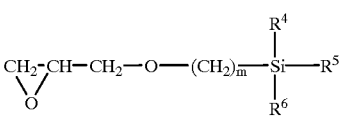

(III-a-1-1)

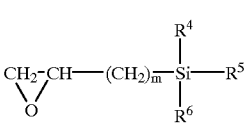

(III-a-1-2)

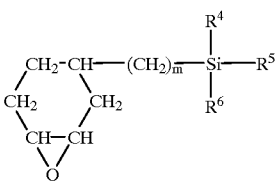

(III-a-2-1)

wherein $R^4$, $R^5$ and $R^6$ may be the same or different, but at least one of them represents an alkoxy group and the remainder represent an alkyl group; and m represents 1 to 6.

5. The copolymer according to claim 1, wherein the monomer, which constitutes the repeating unit (C), having a reactive silicon group, is 3-glycidoxypropyltrimethoxysilane, 3-glycidoxypropylmethyldimethoxysilane, 4-(1,2-epoxy)butyltrimethoxysilane, 5-(1,2-epoxy)pentyltrimethoxysilane or 2-(3,4-epoxycyciohexyl)ethyltrimethoxysilane.

6. The copolymer according to claim 1, wherein the monomer, which constitutes the repeating unit (C), having two epoxy groups, is represented by the formula (III-b):

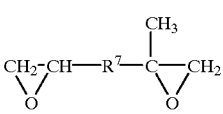

(III-b)

wherein $R^7$ is a divalent organic group.

7. The copolymer according to claim 6, wherein $R^7$ in the formula (III-b) is
  —$CH_2$—O—($CHA^1$—$CHA^2$—O$)_m$—$CH_2$—, —$(CH_2)_m$—, or

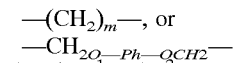

wherein $A^1$ and $A^2$ represent hydrogen or a methyl group; Ph represents a phenylene group; and m represents a numeral of 0 to 12.

8. The copolymer according to claim 1, wherein the monomer, which constitutes the repeating unit (C), having two epoxy groups, is 2,3-epoxypropyl-2',3'-epoxy-2'-methyl propyl ether or ethylene glycol-2,3-epoxypropyl-2',3'-epoxy-2'-methyl propyl ether.

9. The copolymer according to claim 1, wherein the monomer, which constitutes the repeating unit (C), having an ethylenically unsaturated group, is represented by the formula (III-c):

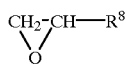 (III-c)

wherein $R^8$ is a group having an ethylenically unsaturated group.

10. The copolymer according to claim 1, wherein the monomer, which constitutes the repeating unit (C), having a halogen atom, is represented by the formula (III-d):

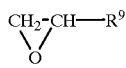 (III-d)

wherein $R^9$ is a group having at least one halogen atom.

11. The copolymer according to claim 1, wherein the monomer which constitutes the repeating unit (C), having a halogen atom is

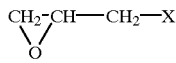

wherein X represents a bromine atom (Br) or an iodine atom (I).

12. The copolymer according to claim 1, wherein the polyether copolymer comprises 3 to 98% by mol of the repeating unit (A), 95 to 1% by mol of the repeating unit (B) and 0.01 to 5% by mol of the repeating unit (C).

13. A crosslinked material obtained by crosslinking the polyether copolymer of claim 1, utilizing the reactivity of a reactive functional group of the copolymer.

14. A polymer solid electrolyte comprising the crosslinked material of claim 13 and an electrolyte salt compound.

15. A polymer solid electrolyte according to claim 14, wherein the electrolyte salt compound is soluble in the polyether copolymer.

16. The polymer solid electrolyte according to claim 14, wherein the electrolyte salt compound is a compound comprising a cation selected from a metal cation, an ammonium ion, an amidinium ion and a guanidium ion, and an anion selected from a chlorine ion, a bromine ion, a iodine ion, a perchlorate ion, a thiocyanate ion, a tetrafluoroborate ion, a nitrate ion, $AsF_6^-$, $PF_6^-$, a stearylsulfonate ion, an octylsulfonate ion, a dodecylbenzenesulfonate ion, a naphthalenesufonate ion, a dodecylnaphthalenesulfonate ion, a 7,7,8,8-tetracyano-p-quinodimethane ion, $X^1SO_3^-$, $(X^1SO_2)(X^2SO_2)N^-$, $(X^1SO_2)(X^2SO_2)(X^3SO_2)C^-$ and $(X^1SO_2)(X^2SO_2)YC^-$ (wherein $X^1$, $X^2$, $X^3$ and Y respectively represent an electron attractive group).

17. The polymer solid electrolyte according to claim 16, wherein $X^1$, $X^2$ and $X^3$ independently represent a perfluoroalkyl or perfluoroaryl group having 1 to 6 carbon atoms and Y represents a nitro group, a nitroso group, a carbonyl group, a carboxyl group or a cyano group.

18. The polymer solid electrolyte according to claim 16, wherein the metal cation is a cation of a metal selected from Li, Na, K, Rb, Cs, Mg, Ca and Ba.

19. The polymer solid electrolyte according to claim 16, wherein the metal cation is a cation of a transition metal.

20. The polymer solid electrolyte according to claim 16, wherein the metal cation is a cation of a metal selected from the group consisting of Mn, Fe, Co, Ni, Cu, Zn and Ag.

21. The polymer solid electrolyte according to claim 14, wherein the formulation ratio of the electrolyte salt compound to the polyether copolymer is so that a value of a molar ratio of the number of moles of the electrolyte salt compound to the total number of moles of oxyethylene units is from 0.0001 to 5.

22. A battery comprising the polymer solid electrolyte of claim 14.

23. A polyether copolymer having a number-average molecular weight of 50,000 to 2,000,000, a glass transition temperature measured by a differential scanning calorimeter (DSC) of not more than −60° C. and a fusion heat of not more than 70 J/g, comprising:

(A) 1 to 98% by mol of a repeating unit derived from a monomer represented by the formula (I):

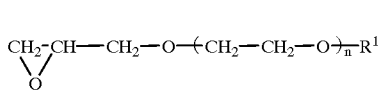 (I)

wherein $R^1$ is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atom and a tetrahydropyranyl group, and n is from 1 to 12;

(B) 95 to 1% by mol of a repeating unit derived from a monomer represented by the formula (II):

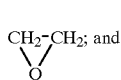 (II)

(C) 0.005 to 15% by mol of a repeating unit derived from a monomer selected from the group consisting of 3,4-epoxy-1-butene, 3,4-epoxy-1-pentene, 4,5-epoxy-2-pentene, glycidyl acrylate and glycidyl methacrylate, the copolymer being a random copolymer.

* * * * *

UNITED STATES PATENT AND TRADEMARK OFFICE
CERTIFICATE OF CORRECTION

PATENT NO. : 6,239,204 B1
DATED : May 29, 2001
INVENTOR(S) : Katsuhito Miura et al.

It is certified that error appears in the above-identified patent and that said Letters Patent is hereby corrected as shown below:

<u>Title page,</u>
Item [73], Assignee: delete "Baiso Co., Ltd." and replace it with -- Daiso Co., Ltd. --

Signed and Sealed this

Seventeenth Day of September, 2002

*Attest:*

*Attesting Officer*

JAMES E. ROGAN
*Director of the United States Patent and Trademark Office*